May 29, 1956   S. D. WILTSE   2,747,899
BALL COMPRESSION TYPE TUBE FITTING
Filed June 16, 1952

INVENTOR.
SUMNER D. WILTSE
BY Whittemore,
Hulbert & Belknap
ATTORNEYS

United States Patent Office 2,747,899
Patented May 29, 1956

2,747,899

BALL COMPRESSION TYPE TUBE FITTING

Sumner D. Wiltse, Detroit, Mich.

Application June 16, 1952, Serial No. 293,711

13 Claims. (Cl. 285—166)

The present invention relates to a tube fitting.

It is an object of the present invention to provide a tube or pipe fitting or connector characterized by its simplicity, the ease with which it may be assembled disassembled and re-assembled, and its efficiency in establishing a fluid-tight seal and in establishing a strong mechanical interconnection between the tube or pipe and the fitting.

More specifically, it is an object of the present invention to provide a fitting of the character described by the provision of a plurality of balls disposed in an annular array in conjunction with means for pressing the balls inwardly to form interlocking indentations in the tube so as to mechanically connect the tube and the fitting.

It is a further object of the present invention to provide in structure of the character described a ball cage in which a circular array of balls are embedded within an annular cage member formed of rubber or the like, with surface portions of the balls substantially tangent to outer surfaces of the annular member.

It is a further object of the present invention to provide a ball cage comprising an annular member formed of rubber or the like, having a substantially triangular cross-section and a circular array of balls embedded in the annular member with the surfaces of the balls substantially tangent to the surfaces of the annular member.

It is a further object of the present invention to provide a device of the character described including a ferrule in conjunction with means for pressing an edge of the ferrule into a tube to provide for retention of tube sealing and engaging parts on the tube when the fitting is disassembled.

Other objects and features of the invention will become apparent as the description proceeds, especially when taken in conjunction with the accompanying drawings, wherein.

Figure 1:
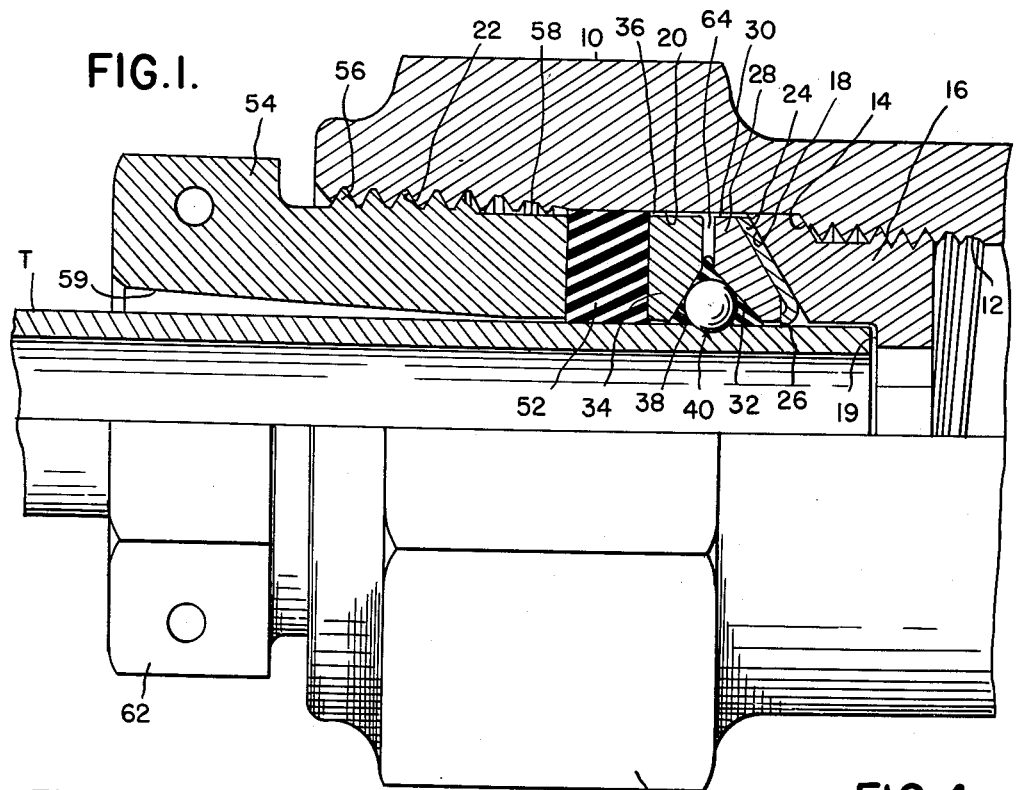
Figure 1 is a side elevation partly in section of a tube or pipe fitting constructed in accordance with the present invention.

The tube or pipe fitting or coupling comprises a body part 10 to which the tube T is to be connected. The body part 10 may be any suitable part, such for example as a nozzle, or it may be a portion of a tube coupling in which case the structure shown in Figure 1 would be duplicated at both ends of the body member. The body member 10 is provided with an elongated recess or opening at one end, having interior threads, as indicated at 12, and a conical seat as indicated at 14 for the reception of a packing seat 16 having a conical surface 18 facing the open end of the tubular part of the body member 10, and a tube seat portion 19 located inwardly from the conical portion 18. Outwardly of the conical seat 14 the body member 10 has a smooth cylindrical bore 20 which merges into an outer threaded portion 22. Received within the tubular portion of the body part 10 is a conical ferrule 24 having its inner edge 26 reversely turned for a purpose which will presently be described. Located outwardly from the ferrule 24 is a ball thrust member 28 having clearance with respect to the cylindrical bore 20, as indicated at 30, and having a conical surface 32.

Located outwardly from the ball thrust member 28 is a ball race thrust member 34 having clearance with respect to the bore 20 as indicated at 36, and having a conical surface 38.

Figure 2:
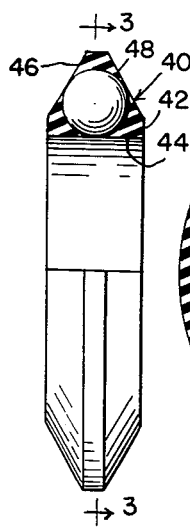
Figure 2 is a side elevation partly in section of the ball cage employed in the present invention.
Figure 3:
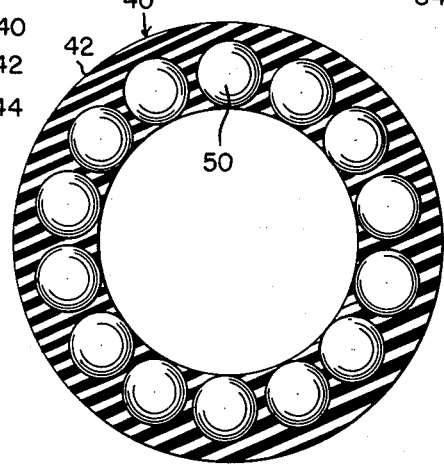
Figure 3 is a section on the line 3—3, Figure 2.

Intermediate the ball race thrust member 34 and the ball thrust member 28 is a ball cage indicated generally at 40. Details of the ball cage 40 are best seen in Figures 2 and 3. In these figures it will be observed that the ball cage 40 comprises an annular body 42 formed of rubber or a similar deformable but relatively rubber-like material. The annular member 40 is generally triangular in cross-section and includes an inner surface 44 and inclined outer surfaces 46 and 48. Embedded within the material of the annular member 42 are a plurality of hardened steel balls 50. The number of balls depends upon the size of the balls and the size of the annular member, but in general the balls are provided in the maximum number possible. However, before compression it will be observed that the balls are spaced apart as clearly illustrated in Figure 3.

Located outwardly from the ball race thrust member 34 is a gasket 52 formed of rubber, synthetic rubber, or other suitable deformable but relatively compressible material.

The particular material from which the gasket 52 and the body 42 of the ball cage 40 are made depends of course upon the particular use for which the fitting is intended. Thus, where the tube is used in conjunction with hydrocarbons the material of the gasket and ball cage will preferably be a synthetic rubber selected for its resistance to destructive action of such materials.

Located outwardly from the gasket 52 is a male fitting or nut 54 which has a threaded portion 56 cooperating with the threaded portion 22 of the body 10, and a cylindrical pilot portion 58 adapted to bear against the outer surface of the gasket 52. The nut 54 is provided with a tapered opening 59 which affords substantial clearance with the outer surface of the tube T and permits limited movement of the tube.

The body 10 is provided with a hexagonal or other non-circular outer configuration as indicated at 60, and the male fitting or nut 54 is similarly provided with a non-circular external configuration as indicated at 62. Accordingly, the body 10 and fitting or nut 54 may be gripped by wrenches and the male fitting screwed into the open end of the tubular portion of the body 10.

In the initial assembly of the parts the tube nut or male fitting 54 is placed upon the end of the tube with its pilot end 58 toward the end of the tube T. Next, the gasket 52, the ball race thrust member 34, the ball cage 40, the ball thrust member 28, and the ferrule 24 are slipped over the end of the tube. Thereafter, the end of the tube carrying the assembled parts is introduced into the open end of the tubular portion of the body 10 to bring the end of the tube adjacent to the seat 19 provided by the packing seat member 16. Thereafter, the nut 54 is engaged with the threads of the body 10 and is tightened to press the assembled parts toward the conical surface 18 of the packing seat 16. Movement of the assembled parts by the nut 54 produces a plurality of results. In the first place, the reversely turned inner end of the ferrule 24 is pressed to the right as seen in Figure 1, and urged radially inwardly to cause the inner corner of the ferrule to bite into the material of the tube T. It will be appreciated that prior to initial compression of the parts, the inner end of the ferrule extends slightly to the left of its position shown in Figure 1.

At the same time, compression developed in the gasket 52 compresses the gasket both radially inwardly and outwardly and establishes a fluid-tight seal between the external surface of the tube T and the internal cylindrical surface 20 of the body 10. At the same time the compressive force developed within the gasket 52 is transmitted to the ball race thrust member 34 and the conical surface 38 thereof engages the balls 50 and tends to move them to the right as seen in Figure 1. Forces applied to the balls 50 are transmitted to the conical surface 32 of the ball thrust member 28 and resultant forces are developed urging the balls inwardly into the tube to the illustrated position. Actual movement of the balls to the full line position shown in Figure 1 is along a path parallel to the straight line elements of the conical surface 32, but the final result is to produce generally spherical or Brinelled indentations in the outer surface of the tube T in which the balls 50 are seated. Inasmuch as the balls are embedded in the elastic annular member 42, this movement of the balls is permitted. It will be observed that the ball race thrust member 34 and the ball thrust member 28 are shaped to provide substantial clearance space 64 therebetween when the balls have been moved radially inwardly their full extent. Some of the material of the annular member 42 is compressed within the space 64 and the space is dimensioned so that the material compressed between members 34 and 28 cannot limit relative approach between these members. In other words, relative approach betwen these members is limited only by the development of reactive forces opposing inward movement of the balls.

An important feature of the present invention is the particular relationship between the angularity of the conical surfaces 32 and 38. In general the conical surface 32 has a substantially smaller included angle than the conical surface 38. In a specific embodiment of the invention which has proved entirely satisfactory in use, the included angle of the conical surface 32 is 90 degrees and the included angle of the conical surface 38 is 120 degrees. In other words, the angle betwen the conical surface 32 and the exterior surface of the tube T is 45 degrees, and the angle betwen the conical surface 38 and the exterior surface of the tube T is 60 degrees. With this arrangement it is found that the balls are not caused to move around the tube T during assembly, but instead move essentially radially inwardly to their final position. Moreover, it is found that with the disclosed arrangement the connection may be repeatedly disassembled and reassembled and the balls 50 in every case will find their original spherical seats. This is an extremely important feature of the present invention. It will be appreciated that if the balls were caused to rotate around the tube during tightening of the nut 54, that instead of producing spherical seats, the balls would produce a shallow groove which would not only tend to weaken the tube, but which would not only tend to weaken the tube, but which would also fail to provide a satisfactory mechanical connection between the tube and fitting. Moreover, it is important that upon re-assembly the balls again enter the original spherical seats since otherwise serious weakening of the tube would result.

In an embodiment of the present invention which has been proven entirely satisfactory in use, a fitting was designed for a steel tube having an outside diameter of .250" and a wall thickness of approximately .032 to .038". The ball thrust member 28 and the ball race thrust member 34 were formed of hardened ball race material such as SAE 52100 steel tempered to 62–64 C scale Rockwell. The balls were 15 in number each having an outside diameter of .0625" and were equally spaced in the rubber-like body 42. It will be appreciated that the balls 50 require circumferential spacing in their original condition since upon compression they move radially inward and it is desired that inward movement of the balls be limited by forces developed in the tube opposing compression of the balls rather than by peripheral engagement between the balls with each other.

Figure 4:
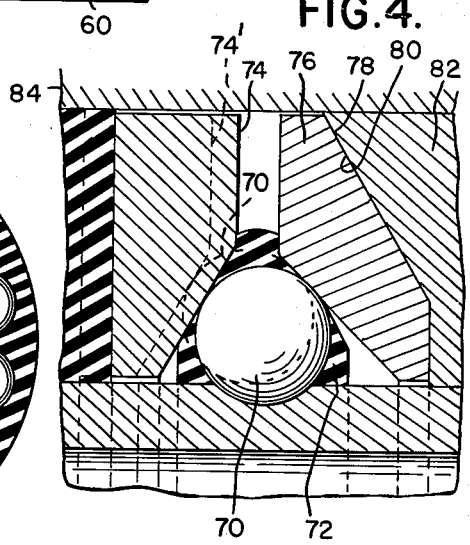
Figure 4 is an enlarged fragmentary sectional view of a modified fitting.

In Figure 4 there is illustrated an enlargement of a similar arrangement in which the balls 70 are embedded in an annular member 72 and cooperate with a ball race thrust member 74 and a ball thrust member 76 which latter has a conical surface 78 engaging directly against the conical surface 80 provided on a packing seat member 82 suitably received within the body 84. In this figure the position of the ball race thrust member 74 before inward movement of the balls 70 is shown in dotted lines at 74' and the position of the balls before radial movement is indicated at 70'.

The ball assembly disclosed herein provides a means of securing the tube from endwise movement in the fitting and retains the tube within the fitting with the least possible structural or physical damage and combines with the sealing gasket to provide a secure fluid-tight resilient tube connection. The ferrule 24 cooperates with the ball thrust member 28 when compressed between it and the packing seat 16 to provide a fluid-tight seal with the tube T, and at the same time provides a permanent attachment between the ferrule 24 and tube T which retains the remaining parts assembled on the tube T in position when the fitting is disassembled.

Radial clearance, which may be on the order of .002" is provided between the outer race 34 and the inner surface 20 of the body 10, and between the outer surface of the tube T. Also, similar clearance is provided between nut 54 and the inner surface 20 of the body 10 and between the outer surface of the tube T. This clearance prevents direct contact between the race 34 and nut 54 with the tube T, but at the same time prevents extrusion of the gasket material.

The relationship between the number and size of balls and the diameter of the tube is important. Best results are obtained when the number and diameter of balls is related to the diameter of the tube for which the fitting is designed so that when such balls are pressed into the surface of the tube to a depth such that approximately 25% of the circumference of the balls is embedded, the sum of the width of all indentations in the tube substantially exceeds half the circumference of the tube. This not only has the effect of providing a maximum holding strength but also provides the ball indentations in closely spaced relation so that upon dis-assembly and re-assembly, the balls will seek and find the original individual ball receiving pockets or seats in the tube produced by initial assembly. The foregoing relationship results when the diameter of the balls is approximately one-quarter of the diameter of the tube for which the fitting is designed and the balls are spaced in the annular retainer with the minimum spacing consistent with radial inward movement of the balls upon assembly without interference between adjacent balls.

The drawings and the foregoing specifications constitute a description of the improved tube fitting in such full, clear, concise and exact terms as to enable any person skilled in the art to practice the invention, the scope of which is indicated by the appended claims.

What I claim as my invention is:

1. A fitting of the character described comprising a body having an outwardly open recess for receiving the end of a tube, means in said recess providing a pair of confronting conically shaped annular surfaces disposed to define a radially outwardly narrowing ball receiving space therebetween, a ball cage intermediate said surfaces provided with an annular array of balls, a deformable sealing gasket in said recess and means for simultaneously applying axial pressure to said gasket to effect radial expansion thereof into sealing engagement with the inner surface of said recess and the outer surface of a tube received in said recess, and effecting relative approach between said surfaces to produce radially inward movement of said balls to form and engage in individual ball receiving seats in a tube received in said fitting.

2. A fitting as defined in claim 1 in which said gasket is located outwardly of said recess from said ball cage.

3. A fitting as defined in claim 2 in which said last mentioned means is a threaded rotatable member.

4. A fitting as defined in claim 3 in which the included cone angle of the conically shaped annular surface outermost in said recess exceeds the included cone angle of said other conically shaped annular surface.

5. A fitting comprising a body having an outwardly open tube receiving recess, a concavely conical annular seat in said recess, a generally conical annular ferrule engaging said seat, the inner portion of said ferrule being formed to provide an axially outwardly extending short annular flange, an inner ball thrust race having a portion engageable with said flange to press said flange into engagement with the outer surface of a tube received in said fitting, a ball cage assembly comprising an annular body of deformable material having a plurality of balls embedded therein, an outer ball thrust race, said inner and outer ball thrust races having confronting annular surfaces defining a radially outwardly narrowing space therebetween, said surfaces being engageable with said balls, an expansible sealing gasket engaging the axially outer surface of said outer race, and a member threaded to said body having a portion engageable with the axially outer portion of said gasket to press against said gasket and to apply pressure therethrough to said outer race to force said balls radially inwardly into engagement with the tube, and to press said inner race against the axially bent flange of said ferrule.

6. A fitting as defined in claim 5 in which said outer ball thrust race and said member have slight radial clearance with respect to the interior of said body and with respect to the tube for which said fitting is designed to retain said sealing gasket under pressure in operating condition without extrusion.

7. A tube engaging fitting comprising a body having a circular opening for receiving the end of a tube, a first rigid annular conical ball seat in said body, an annular member relatively movable axially in said body and having a second rigid annular conical ball seat movable toward and away from said first ball seat, a ring of yieldable material and being substantially triangular in cross section in the space between said seats, balls in said ring having surfaces tangent to both the end and inner surfaces thereof for direct engagement with said seats and with a tube end in said body, and means for forcing relative axial movement between said body and said annular member to force said balls inwardly with the material of a tube in said body and to apply sealing pressure to the yieldable material of the ring.

8. A tube engaging fitting comprising a pair of concentric, rigid annular members adapted to surround the end portion of a pipe or tube and having confronting rigid annular ball engaging surfaces relatively inclined to each other to define a radially outwardly narrowing space therebetween, a ring formed of yieldable sealing material and being substantially triangular in cross section between said surfaces, said ring having a series of rigid balls embedded therein having the surfaces of the balls substantially tangent to both end surfaces and the inner surface of said ring for substantially direct engagement with the ball engaging surfaces of said members and with the surface of a pipe or tube in said fitting, said sealing material and balls substantially filling said space, means for forcing one of said members to move axially toward the other to cause the ball engaging surfaces thereof to approach to force said balls to form individual separate substantially spherical seats in the material of the pipe or tube.

9. A fitting as defined in claim 8 in which said ring is of uniform radial cross-section and in assembly is pressed into continuous surface-to-surface sealing contact with both of said ball engaging surfaces and the surface of a pipe or tube in said fitting.

10. A fitting of the character described comprising a body having an outwardly open longitudinal recess for receiving the end of a tube, means within said recess providing an outwardly facing concave conical ball engaging surface, an annular ball engaging member movable longitudinally in said recess and provided with a concave conical ball engaging surface confronting the first mentioned ball engaging surface and defining therewith a radially outwardly narrowing space, an annular ball retainer of generally triangular cross-section formed of a yieldable sealing material disposed in said space, said ball retainer having embedded therein an annular array of balls the surfaces of which are substantially tangent to the three outer surfaces of said ball retainer, a threaded member having an annular portion movable longitudinally in said recess to press the annular ball engaging member toward said first mentioned ball engaging surface to engage the balls and to force said balls inwardly to form and seat themselves in substantially spherical ball seats in the end portion of a tube received within said fitting.

11. A fitting of the character described comprising a body having an outwardly open longitudinal recess for receiving the end of a tube, an annular shoulder at the inner end of said recess, inner and outer annular ball engaging members relatively movable longitudinally in said recess and provided with confronting conical surfaces defining therebetween a radially outwardly narrowing space, an annular ball retainer including an annular array of balls in the space between said members, a threaded member having an annular portion movable longitudinally in said recess to press the inner ball engaging member against said shoulder and thereafter to force the outer ball engaging member toward the inner ball engaging member to force said balls inwardly to indent them in individual ball seats in the tube end, and a resilient sealing ring interposed between the annular portion of said threaded member and the outer ball engaging member.

12. A fitting of the character described comprising a body having an outwardly open longitudinal recess for receiving the end of a tube, an annular shoulder at the inner end of said recess, a pair of annular ball engaging members relatively movable longitudinally in said recess and provided with confronting conical surfaces defining therebetween a radially outwardly narrowing space, an annular ball retainer including an annular array of balls in the space between said members, a threaded member having an annular portion movable longitudinally in said recess to press the inner ball engaging member against said shoulder and thereafter to force the outer ball engaging member toward the inner ball engaging member to force said balls inwardly to indent them in individual ball seats in the tube end, and an annular ferrule between said shoulder and said inner ball engaging member, said ferrule having a radially inner edge portion inclined toward said inner ball engaging member and deflectable thereby radially inwardly to bite into a tube when said threaded member is tightened, said ferrule being thereby connected to the tube end and serving to retain said ball engaging members and said ball retainer on the tube end when the tube end is removed from said body.

13. A tube fitting comprising a body having an outwardly open tube receiving recess including an annular outward facing concavely conical ball engaging surface, a ball cage next adjacent said surface provided with an annular array of balls, said balls being carried by said cage in uniform circumferentially spaced relation with provision for radial inward movement, a ball race thrust member having an inwardly facing concavely conical ball engaging surface, and means for moving said thrust member toward said first mentioned ball engaging surface to thereby force said balls radially inwardly to form and seat themselves in generally spherical seats in a tube received in said recess, said ball cage comprising an annular body of generally triangular cross-section and of deformable material, said balls being embedded therein and being substantially tangent to the surfaces of said annular body, the outwardly facing conical surface being provided by a separate ball thrust member, a removable packing seat in said recess, a ferrule between said packing seat and said ball thrust member, said ferrule having an inner portion engageable by said ball thrust member and movable thereby into locking and sealing engagement with the tube, said ferrule being removable with the tube from the recess in said body after having been locked thereto by initial assembly of the parts.

References Cited in the file of this patent

UNITED STATES PATENTS

| | | |
|---|---|---|
| 1,653,708 | Howie | Dec. 27, 1927 |
| 2,221,064 | Tobler | Nov. 12, 1940 |
| 2,283,975 | Dillon | May 26, 1942 |
| 2,470,546 | Carlson | May 17, 1949 |
| 2,531,021 | Bard | Nov. 21, 1950 |